United States Patent

Ono et al.

[11] Patent Number: 5,340,929
[45] Date of Patent: Aug. 23, 1994

[54] TRISAZO DYE AND DYE COMPOSITION CONTAINING THE SAME

[75] Inventors: Takashi Ono, Takatsuki; Tatsuya Yagyu; Yoshihiro Sawatari, both of Neyagawa; Masaki Yonezawa, Kadoma, all of Japan

[73] Assignee: Orient Chemical Industries, Ltd., Osaka, Japan

[21] Appl. No.: 16,999

[22] Filed: Feb. 12, 1993

[30] Foreign Application Priority Data

Feb. 12, 1992 [JP] Japan ................................. 4-024878

[51] Int. Cl.$^5$ ....................... C09B 35/46; C09D 11/00
[52] U.S. Cl. .................................... 534/680; 534/685; 534/728; 534/815; 106/22 K
[58] Field of Search ............... 534/680, 685, 728, 815; 106/22 K

[56] References Cited

FOREIGN PATENT DOCUMENTS

| 56333 | 7/1982 | European Pat. Off. |
| 1524403 | 9/1978 | United Kingdom . |
| 2168368 | 6/1986 | United Kingdom . |

*Primary Examiner*—Robert W. Ramsuer
*Assistant Examiner*—Fiona T. Powers
*Attorney, Agent, or Firm*—Birch, Stewart, Kolasch & Birch

[57] ABSTRACT

The present invention provides a trisazo dye represented by the formula:

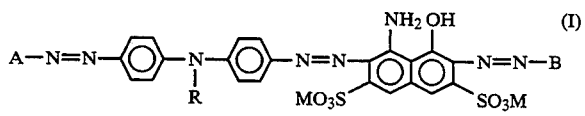

wherein B is a substituted or non-substituted phenyl group, A is a phenyl group substituted with at least one substituent selected from the group consisting of an amino group, a substituted amino and a hydroxyl group, R is a substituted or non-substituted phenyl group or an alkyl group having 1 to 8 carbon atoms, and M is hydrogen, alkali metal, aliphatic alkyl ammonium or alkanol ammonium. An aqueous ink composition and a process for the producing a concentrated solution containing the trisazo dye are also disclosed.

22 Claims, 3 Drawing Sheets

FIG. 3

TRISAZO DYE AND DYE COMPOSITION CONTAINING THE SAME

FIELD OF THE INVENTION

The present invention relates to a novel trisazo dye. More particularly, it relates to an aqueous ink composition containing the trisazo dye and a process for producing a concentrated solution containing the trisazo dye.

BACKGROUND OF THE INVENTION

Heretofore, as a writing ink or jet printing ink used for recording on materials to be recorded (e.g. paper, etc.) or an ink for dyeing fibers, hides and the like, various polyazo dyes have been employed.

The polyazo dye consists mainly of direct dyes and, therefore, a dyeing process is simple and fastness is comparatively excellent. Polyazo dyes having such advantages are widely employed in the industry.

However, regarding the polyazo dye, there are problems to be solved. Firstly, there is a problem as to chemical properties, because excellent chemical properties such as stable solubility of dye, stability of concentrated dye solution with time and stability of dye density with time are required for dyes which are used for writing ink.

Secondly, there is a problem about safety, because safety of chemical substances has recently been noted and dyes having excellent safety which have no bad influence upon the human body are required.

As the dye wherein dyeing properties and fastness are improved, for example, benzidine or benzidine derivative based black trisazo dyes or polyazo dyes (e.g. C.I. Direct Black 19, C.I. Direct Black 154, C.I. Direct Black 168, etc.) have been widely used. However, these dyes have problems as to safety for humans because the Ames test gives false positive or positive results.

On the other hand, as useful polyazo black dyes with improved safety for humans are, for example, food colors (e.g. recording solution wherein Food Black 2 is used as a recording agent, etc.), 4,4'-diaminodiphenylamine-2-sulfonic acid (substituent for benzidine) based trisazo dyes, stilbene tetrakisazo dyes having no amino group in a molecular structure and the like. However, an aqueous ink wherein these dyes are used has poor water and light resistance and, therefore, dyeing properties and fastness are inferior.

Polyazo dyes which satisfy the above properties have never been obtained.

Further, water-soluble dyes may be separated from aqueous systems by means such as aciding-out, salting out and the like. However, it is difficult to obtain dyes having high purity because of inclusion of inorganic salts upon separation, whereby, various problems are caused. For example, when a dye having low purity is used for an aqueous writing ink, there is a disadvantage in that the ink is not consistently fed to a pen point. Also, when a dye having low purity is used for a jet printing ink, clogging of the outlet orifice may occur.

OBJECTS OF THE INVENTION

One object of the present invention is to provide a trisazo dye having excellent chemical properties (e.g. dyeing properties, fastness, hue, solubility, etc.) and safety.

Another object of the present invention is to provide an aqueous ink composition containing the trisazo dye.

Still another object of the present invention is to provide a process for producing a highly purified trisazo dye concentrated solution.

These objects as well as other objects and advantages of the present invention will become apparent to those skilled in the art from the following description with reference to the following drawings.

SUMMARY OF THE INVENTION

According to the present invention, there is provided a trisazo dye represented by the formula:

wherein B is a substituted or non-substituted phenyl group, A is a phenyl group substituted with at least one substituent selected from the group consisting of an amino group, a substituted amino group and a hydroxyl group, R is a substituted or non-substituted phenyl group or an alkyl group having 1 to 8 carbon atoms, and M is hydrogen, alkali metal, aliphatic alkyl ammonium or alkanol ammonium, an aqueous ink composition containing the trisazo dye and a process for producing a concentrated solution containing the trisazo dye.

DETAILED DESCRIPTION OF THE INVENTION

The trisazo dye of the present invention is a reddish black dye having a bond group of the formula:

wherein R is a non-substituted or substituted phenyl group, or an alkyl group having 1 to 8 carbon atoms, which is introduced into a molecular structure by tetrazotization of 4,4'-diaminotriphenylamine or N-alkyl--4,4'-diaminophenylamine.

The dye of the formula (I) of the present invention is obtained by a process including the steps of:
tetrazotizing a diamino compound (1 mol) of the formula:

wherein R is as defined above, by a normal method to obtain a tetrazonium salt (step 1);

adding an aqueous solution of 1-amino-8-naphthol-3,6-disulfonic acid (1 mol) to the resulting tetrazotized solution to conduct coupling (step 2);

adding a diazotized diazo component B (1 mol) to the reaction solution to obtain a disazo dye (step 3);

adding a coupling component A (1 mol) to the reaction solution to conduct coupling to obtain a trisazo dye (step 4); and concentrating and purifying the resulting reaction solution (step 5).

The reactions or operation conditions used in the above steps 1 to 5 are known to the art.

Preferred examples of the diamino compound used in the step 1 include 4,4'-diaminotriphenylamine, N-tolyl-4,4'-4,4'-diaminodiphenylamine, N-methyl-4,4'-diaminodiphenylamine, N-ethyl-4,4'-diaminodiphenylamine, N-butyl-4,4'-diaminodiphenylamine, N-hexyl-4,4'-diaminodiphenylamine, N-octyl-4,4'-diaminodiphenylamine and the like. It is particularly preferred to use 4,4'-diaminotriphenylamine and N-C$_{1-4}$-alkyl-4,4'-diaminodiphenylamine.

Preferred examples of the diazo component B used in step 3 include non-substituted or substituted anilines, e.g. aniline, o-, m- and p-toluidine, o-, m- and p-xylidine, anisidine, cresidine, p-nitroaniline, p-chloroaniline, ethylaniline, p-(sec-butyl)aniline, etc. and aminobenzene derivatives such as aminobenzenesulfonic acids, e.g. orthanilic acid, methanilic, sulfanilic acid, etc. It is particularly preferred to use aniline, sulfanilic acid and p-(t-butyl)aniline.

Preferred examples of the coupling component A used in step 4 include phenol derivatives (e.g. o-, m- and p-aminophenol, resorcin, catechol, cresol, 4-t-butyl-phenol, 4-hydroxyanisole, chlorophenol, acetylaminophenol, etc.), N,N-diethylaniline, N-($\beta$-oxyethyl)aniline and N,N-di($\beta$-oxyethyl)aniline. It is particularly preferred to use m-aminophenol and resorcin.

The trisazo dye of the present invention thus obtained has the same light resistance as that of a benzidine or tolidine azo dye as well as excellent water resistance (water resistance of writing) in comparison with the above azo dye, and is superior in solubility to an aqueous medium. Further, the trisazo dye of the present invention is a nontoxic trisazo dye which gives negative results in a back mutation test using an organism, which is generally known as a test method for evaluating toxicity, i.e. AMES test (mutation test).

The sulfonic group in the trisazo dye of the present invention can be converted into an alkali metal or ammonium salt, like several azo dyes having the sulfonic group. Further, it can also be converted into an amine salt with fatty amine or alkanolamine.

As the amine used for preparing the trisazo dye of the present invention, for example, there are aliphatic amines, e.g. butylamine, dibutylamine, sec-butylamine, di-t-butylamine, n-, iso-, sec- and t-amylamine, hexylamine, pentylamine, octylamine, 2-ethylhexylamine, di-(2-ethylhexyl)amine, dodecylamine, etc.; alicyclic amines e.g. cyclohexylamine, di-cyclohexylamine, etc.; alkoxyalkylamines, e.g. 3-ethoxypropylamine, di-(3-ethoxypropyl)amine, 3-butoxypropylamine, octooxypropylamine, 3-(2-ethylhexyloxy)propylamine, etc.; alkanol group-containing amines, e.g. ethanolamine, diethanolamine, triethanolamine, N-cyclohexyl-N-ethanolamine, N-dodecylimino-di-ethanol, etc. and the like.

By converting the sulfonic group in the trisazo dye of the present invention into an amine salt, a water-soluble or alcohol-soluble dye can be prepared depending upon the kind of the above basic compound.

In the preferred embodiment of the present invention, a reverse osmosis method is used in step 5 of concentrating and purifying a solution which contains the trisazo dye of the present invention obtained in the steps 1 to 4. By the concentration/purification step, a conventional problem which is caused by inclusion of impurities upon separation of the water-soluble dye is solved.

The reverse osmosis method is a concentration method employing a phenomenon wherein a solvent is transferred through a semipermeable membrane from a concentrated solution side to a dilute solution side by applying a pressure larger than the osmotic pressure to the concentrated solution side which is partitioned from a dilute solution by the semipermeable membrane.

Preferred examples of the semipermeable membrane used in the concentration/purification step include reverse osmosis membranes (e.g. acetylcellusole membrane, synthesized high polymeric composite membrane, chargeable synthesized polymeric composite membrane, etc.).

The concentration/purification step in the present invention is conducted by cycling a reaction solution containing the trisazo dye of the present invention obtained in steps 1 to 4 while applying a pressure of about 4 to 8 Kgf/cm$^2$ to one side of a pressure resistant acrylic vessel which is partitioned by the semi-permeable membrane, until the conductivity of permeated water becomes 1 $\mu$s or less.

According to the concentration/purification step using the reverse osmosis method, a concentration of the dye solution is optionally controlled to 10 to 20% by weight. The concentrated solution of the dye thus obtained has high purity and is stable for a long period of time. Preferably, the concentrated solution of the present invention is a trisazo dye solution, which comprises 15% by weight of a trisazo dye of the formula (I) and 85% by weight of a medium (water).

The present invention also provides an aqueous ink composition comprising a trisazo dye of the formula (I) and an aqueous medium.

As the preferred examples of the aqueous organic solvent used for the aqueous ink composition of the present invention, for example, there are lower alcohols such as monovalent alcohols, e.g. ethanol, n-propanol, iso-propanol, n-butanol, diacetone alcohol, etc.; monoalkyl ethers of diols, e.g. ethylene glycol monomethyl ether, ethylene glycol monoethyl ether, propylene glycol monoethyl ether, diethylene glycol monoethyl ether, diethylene glycol monobutyl ether, dipropylene glycol monoethyl ether, etc.; monoacetates of diols e.g. ethylene glycol monoacetate, polypropylene glycol monoacetate, etc.; benzyl alcohol, cyclohexanol, divalent alcohols (e.g. glycols such as ethylene glycol, diethylene glycol, trimethylene glycol, triethylene glycol, tetraethylene glycol, polyethylene glycol, propylene glycol, butanediol, etc.), trivalent alcohols (e.g. glycerin, trimethylolpropane, 1,2,6-hexanetriol, etc.), dioxane, N-methyl-2-pyrrolidone, ethyl lactate and the like. It is particularly preferred to use low toxic or nontoxic iso-propanol, ethylene glycol, propylene glycol monoalkyl ether, N-methyl-2-pyrrolidone, lactate and the like.

The preferred amount of the organic solvent in the aqueous ink composition of the present invention is 5 to 95% by weight, preferably 10 to 80% by weight, more preferably 15 to 30% by weight, based on the total weight of the ink composition.

The amount of the trisazo dye in the aqueous ink varies depending upon the application of the ink and is not specifically limited. It is preferred that the amount is generally 5 to 10% by weight for a ball-point pen, 5 to 15% by weight for a marking pen and 3 to 10% by weight for a jet recording ink.

According to the purpose to be used, there can be used a suitable amount of additives which are normally used, for example, water-soluble resins (e.g. low condensate of vinyl pyrrolidone, water-soluble alkyd resin, water-soluble acrylic resin, etc.), alcohol-soluble resins (e.g. alcohol-soluble phenol resin, acrylic resin, styrene maleic resin, ketone resin, etc.), preservatives, pH adjustors, surfactants and the like.

The aqueous ink composition of the present invention thus obtained can be used for various inks having excellent dissolution stability and stability in addition to writing ink and jet recording solution, and the resulting writing thereof is fast. Further, when the aqueous solution of the trisazo dye obtained by the process of the present invention is used for dyeing cellulose fibers or hides, build-up property is excellent and fast dyeing can be conducted.

The following Examples and Comparative Examples further illustrate the present invention in detail but are not construed to limit the scope thereof. In the Examples and Comparative Examples, all "parts" are by weight unless otherwise stated.

EXAMPLE 1

4,4'-Diaminotriphenylamine (27.5 parts, 0.1 mols) was dissolved in concentrated hydrochloric acid (25 parts) and water (150 parts) with heating and the mixture was tetrazotized by adding a 36% aqueous solution of sodium nitrite (42.5 parts, 0.2 mols) at 0° C. To the resulting tetrazotized solution was added an aqueous solution of 1-amino-8-naphthol-3,6-disulfonic acid (36.4 parts, 0.1 mols), followed by stirring at 5° to 10° C. for 2.5 hours. Thereafter, this solution was adjusted to pH 3.5 to 4.0 with a 10% aqueous solution of sodium carbonate, followed by additional stirring at 5° to 15° C. for 17 hours. Then, this solution was adjusted to pH 8.3 to 8.6 with a 20% solution of sodium carbonate. A solution of aniline (9.3 parts, 0.1 mols) as a diazo component B which was diazotized in advance was added to the solution and stirred at 5° to 15° C. for 5 hours. Then, a solution obtained by dissolving m-aminophenol (10.9 parts, 0.1 mols) into water (150 parts) was further added to the solution and stirred overnight to complete the reaction.

The resulting dye-containing solution was concentrated and purified using a chargeable synthesized polymeric composite membrane (trade name of "NTR7410", manufactured by Nitto Denko Co.) as a reverse osmosis membrane according to a reverse osmosis method comprising pressing a dye-containing solution side at a pressure of about 4 to 8 Kgf/cm² to obtain a concentrated dye solution.

The concentrated solution containing the trisazo dye thus obtained was concentrated and dried to obtain 77 g of a black dye. By high performance liquid chromatography (HPLC) and visible absorption spectrum analysis, it was confirmed that the resulting dye is a dye has a structure of the following formula. A maximum absorption wavelength (nm) of a visible absorption spectrum of the dye solution is also shown.

$\lambda_{max}$(nm): 486, 606; Black powder

Figure 1:
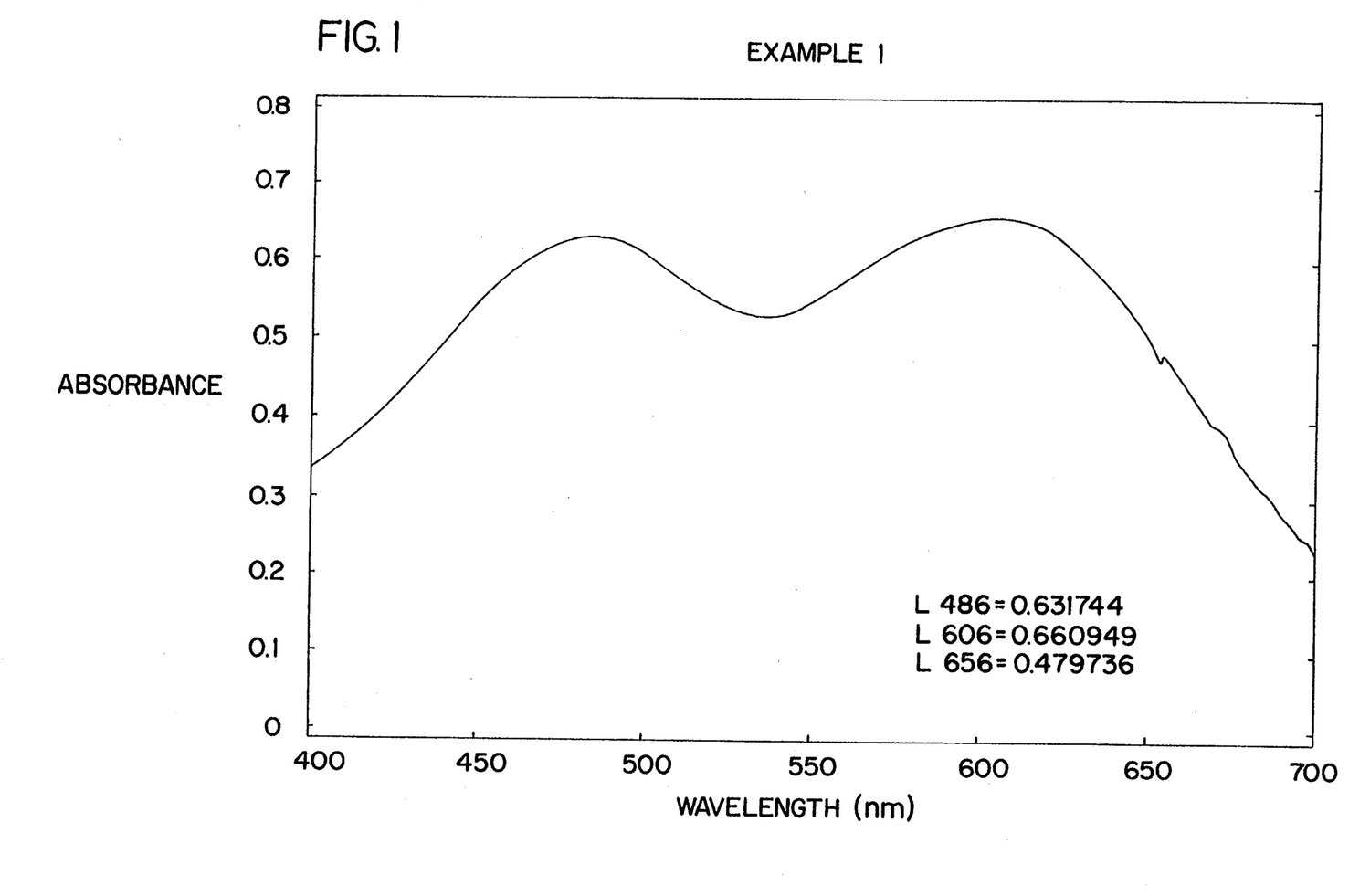
FIG. 1 is a graph illustrating a visible spectrum of a trisazo dye of one embodiment of the present invention.
Figure 3:
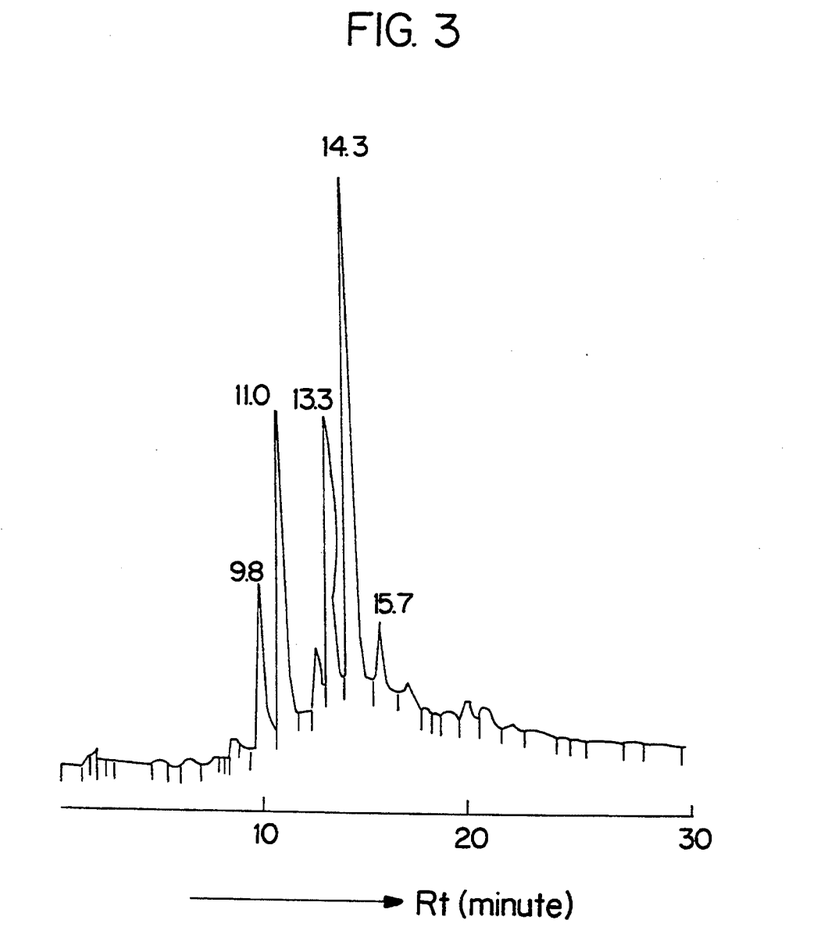
FIG. 3 is a graph illustrating a liquid chromatography of a trisazo dye of one embodiment of the present invention.

The evaluation results of writing of the dye are shown in Table. 1 and those of Ames test are shown in Table. 1 and Table. 2. Further, a visible spectrum is shown in FIG. 1 and a liquid chromatography is shown in FIG. 3.

Liquid chromatography analysis was conducted under the following conditions.
1. Column: NUCLEOSIL 10C8 4.0*200 mn
2. Carrier:

| Transfer phase | | |
|---|---|---|
| (Solution A) | CH₃CN | 10 ml |
| | H₂O | 90 ml |
| | CH₃COOH | 20 μl |
| | KH₂PO₄ | 0.02 N |
| (Solution B) | CH₃CN | 10 ml |
| | H₂O | 90 ml |
| Gradient condition | | |
| Initial condition | → | Final condition |
| Solution A 80% | 25 min. | Solution B 20% |
| Solution B 20% | | Solution A 80% |

3. Flow rate: 1.5 ml/min.
4. Column temperature: 45° C.
5. Sensing wavelength: 600 nm
6. Preparation of sample:

A concentrated solution (200 μl) was dissolved in DMF (5 ml) and the resulting solution (200 μl) was dissolved in a carrier solution (5 ml) to obtain a sample solution for analysis. By using this sample solution (10 μl), analysis was conducted.

EXAMPLE 2

According to the same manner as that described in Example 1 except for using N-tolyl-4,4'-diaminodiphenylamine (0.1 mols) and resorcin in place of 4,4'-diaminotriphenylamine and m-aminophenol as a coupling component A, a dye was obtained. Analysis was conducted according to the same manner as that described in Example 1. It was confirmed that the resulting dye has a structure of the following formula. A maximum absorption wavelength (nm) of a visible absorption spectrum of the dye solution is also shown.

λ$_{max}$ (nm): 486, 606; Black powder

The evaluation results of writing of the dye are shown in Table. 1 and those of Ames test are shown in Table. 1 and Table. 2.

EXAMPLE 3

According to the same manner as that described in Example 1 except for using p-sec-butylaniline and resorcin in place of aniline as a diazo component B and m-aminophenol as a coupling component A, a dye was obtained. Analysis was conducted according to the same manner as that described in Example 1. It was confirmed that the resulting dye has a structure of the following formula. A maximum absorption wavelength (nm) of a visible absorption spectrum is also shown.

λ$_{max}$ (nm): 486, 606; Black powder

The evaluation results of writing of the dye are shown in Table. 1 and those of Ames test are shown in Table. 1 and Table. 2.

EXAMPLE 4

According to the same manner as that described in Example 1 except for using sulfanilic acid in place of aniline as a diazo component B, a dye was obtained. Analysis was conducted according to the same manner as that described in Example 1. It was confirmed that the resulting dye has a structure of the following formula. A maximum absorption wavelength (nm) of a visible absorption spectrum is also shown.

λ$_{max}$ (nm): 486, 606; Black powder

The evaluation results of writing of the dye are shown in Table. 1 and those of Ames test are shown in Table. 1 and Table. 2.

EXAMPLE 5

According to the same manner as that described in Example 1 except for using N-methyl-4,4'-diaminodiphenylamine (21.3 parts, 0.1 mols) in place of 4,4'-diaminotriphenylamine (0.1 mols), a concentrated dye solution was obtained.

A dye content was concentrated and dried from the obtained concentrated solution containing a trisazo dye to obtain a black dye (71 g). Analysis was conducted according to the same manner as that described in Example 1. It was confirmed that the dye has a structure of the following formula. A maximum absorption wavelength (nm) of a visible absorption spectrum is also shown.

λ$_{max}$ (nm): 484, 606; Black powder

Figure 2:
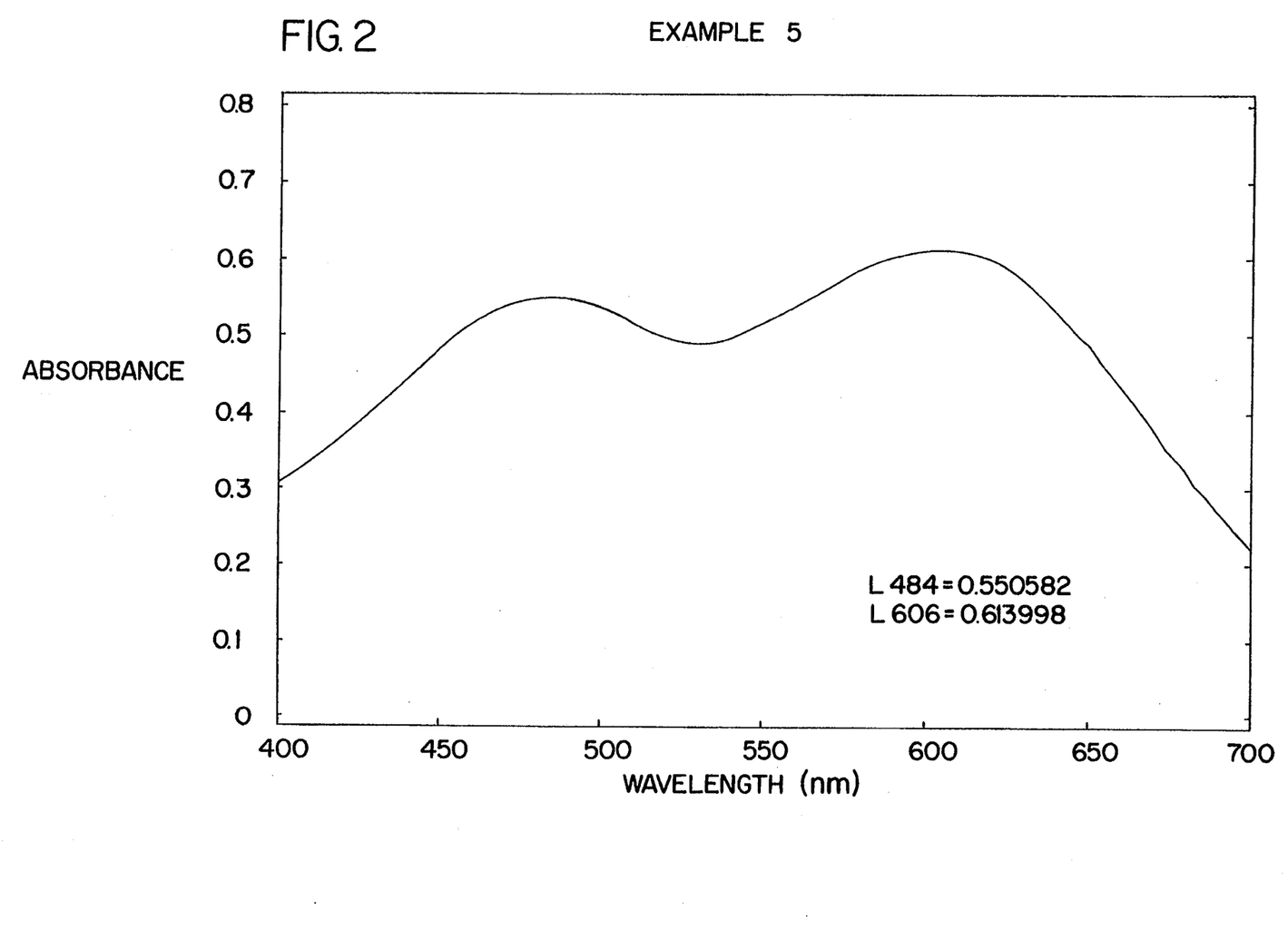
FIG. 2 is a graph illustrating a visible spectrum of a trisazo dye of another embodiment of the present invention.

The evaluation results of writing of the dye are shown in Table. 1 and those of Ames test are shown in Table. 1 and Table. 2. A visible spectrum of the dye is shown in FIG. 2.

EXAMPLE 6

According to the same manner as that described in Example 1 except for using N-butyl-4,4'-diaminodiphenylamine (0.1 mols) and p-sec-butylaniline in place of 4,4'-diaminotriphenylamine and aniline as a diazo component B, a dye was obtained. Analysis was conducted according to the same manner as that described in Example 1. It was confirmed that the resulting dye has a structure of the following formula. A maximum absorption wavelength (nm) of a visible absorption spectrum is also shown.

EXAMPLE 8

According to the same manner as that described in Example 1 except for using N-octyl-4,4'-diaminodiphenylamine (0.1 mols) and sulfanilic acid in place of 4,4'-diaminotriphenylamine and aniline as a diazo component B, a dye was obtained. Analysis was conducted according to the same manner as that described in Example 1. It was confirmed that the resulting dye has a structure of the following formula. A maximum absorption wavelength (nm) of a visible absorption spectrum is also shown.

$\lambda_{max}$ (nm): 484, 606; Black powder

The evaluation results of writing of the dye are shown in Table. 1 and those of Ames test are shown in Table. 1 and Table. 2. A visible spectrum of the dye is shown in FIG. 2.

$\lambda_{max}$ (nm): 484, 606; Black powder

The evaluation results of writing of the dye are shown in Table. 1 and those of Ames test are shown in Table. 1 and Table. 2.

EXAMPLE 7

According to the same manner as that described in Example 1 except for using N-hexyl-4,4'-diaminodiphenylamine (0.1 mols) and o-toluidine in place of 4,4'-diaminotriphenylamine and aniline as a diazo component B, a dye was obtained. Analysis was conducted according to the same manner as that described in Example 1. It was confirmed that the resulting dye has a structure of the following formula. A maximum absorption wavelength (nm) of a visible absorption spectrum is also shown.

COMPARATIVE EXAMPLE 1

According to the same manner as that described in Example 1 except for using diaminodiphenylamine-2-sulfonic acid (0.1 mols) in place of 4,4'-diaminotriphenylamine, a dye of Comparative Example 1 (C.I. Direct Black 168) was obtained. Analysis was conducted according to the same manner as that described in Example 1. It was confirmed that the resulting dye has a structure of the following formula. A hue is also shown.

(C.I. Direct Black 168)

Reddish black

The evaluation results of writing of the dye are shown in Table. 1 and those of Ames test are shown in Table. 1 and Table. 2.

$\lambda_{max}$ (nm): 484, 606; Black powder

The evaluation results of writing are shown in Table. 1 and those of Ames test are shown in Table. 1 and Table. 2.

COMPARATIVE EXAMPLES 2 AND 3

According to the same manner as that described in Example 1 except for using the following trisazo dye or polyazo dye, a dye was obtained. Ames test was conducted and writing was evaluated. The results are shown in Table. 1 and Table. 2.

|  | Dye | Hue |
|---|---|---|
| Comp. Example 2 | C.I. Direct Black 19 | yellowish black |
| Comp. Example 3 | C.I. Direct Black 154 | greenish black |

Evaluation method of writing

Light resistance: The resulting dye was dissolved in a 5% aqueous diethylene glycol solution to obtain a 3% dye solution. The solution was extended over a writing paper A (JIS P-3201) with an applicator (25 μ) to form a drawndown paper, which was exposed to sunlight for one month. A degree of discoloration was compared with that before testing.

Water resistance: The drawndown paper was air-dried for one day and dipped in tap water. Then, a deflection density was measured by a Macbeth densitometer (manufactured by Colmorgen Co. as TR-927) to compare with that before testing.

Evaluation criteria
Light resistance:
A: Little discoloration is observed.
B: Discoloration is observed.
C: Discoloration is severe.
Water resistance:
A: Reflection density is more than 70% of that before testing.
B: Reflection density is 50 to 70% of that before testing.
C: Reflection density is less than 50% that before testing.

Evaluation method of Ames test

Regarding various specimen solutions respectively containing a trisazo dyes obtained in Examples 1 to 8 of the present invention and dyes of Comparative Examples 1 to 3, the number of mutant colonies was determined using strains TA98. A ratio of the number of colonies determined by Ames test to a control was shown in Table. 2. When the ratio is less than 2, it is "negative" and, when the ratio is more than 2, it is "positive", and the results are shown in Table. 1.

In Table. 2, the column (—) shows the ratio when no drug metabolic active enzyme S-9 is added, and the column (+) shows the ratio when a drug metabolic active enzyme S-9 is added.

| Component | Amount (parts by weight) |
|---|---|
| Deionized water | 35 |
| Propylene glycol | 15 |
| Concentrated solution of Example 1 | 50 |
| Surfactant (Unidine DS-401) | 1 |
| Preservative | 0.1 |

A black ink for an aqueous ball point pen was made according to the above formulation and a writing performance was examined. Smooth writing was available for a long period of time, and light and water resistance of writing was excellent.

| Component | Amount (parts by weight) |
|---|---|
| Deionized water | 35 |
| Ethylene glycol | 10 |
| Diethylene glycol | 5 |
| Concentrated solution of Example 3 | 50 |
| Preservative | 0.2 |

A black ink for a marking pen was made according to the above formulation and a writing performance was examined. Smooth writing was available for a long period of time, and light and water resistance of writing was excellent.

| Component | Amount (parts by weight) |
|---|---|
| Deionized water | 70 |
| Diethylene glycol | 10 |
| Sodium benzoate | 0.1 |
| Concentrated solution of Example 7 | 20 |

A black jet printing ink was made according to the above formulation and a recording performance was examined using a commercially available ink-jet printer. Printing could be conducted without clogging of orifice, and light and water resistance of the recorded literature/image was excellent.

Stability of concentrated solution with time

Each concentrated solution obtained in Examples 1 to 8 was charged in a 50 ml glass sample bottle, respectively. Then, stability with time was evaluated, using an incubator (manufactured by Sanyo Denki Co.). In a test (temperature range: −5° to 50° C.; repeat time: 60 minutes; test period: 3 months), precipitation of the dye and change of properties of the concentrated solution were not observed.

TABLE 1

| | Novel trisazo dye | | | Writing evaluation | | | |
|---|---|---|---|---|---|---|---|
| | Component A | R | Component B | Hue | Water resistance | Light resistance | AMES evaluation |
| Ex. 1 | m-Amino phenol | Phenyl group | Aniline | Reddish black | A | B | Negative |
| Ex. 2 | Resorcin | Tolyl group | Aniline | Reddish black | B | B | Negative |
| Ex. 3 | Resorcin | Phenyl group | p-sec-Butylaniline | Reddish black | A | B | Negative |
| Ex. 4 | m-Amino phenol | Phenyl group | Sulfanilic acid | Reddish black | A | B | Negative |
| Ex. 5 | m-Amino phenol | Methyl group | Aniline | Reddish black | B | B | Negative |
| Ex. 6 | m-Amino phenol | Butyl group | p-sec-Butylaniline | Reddish black | A | B | Negative |

TABLE 1-continued

|  |  |  |  | Writing evaluation | | | |
|---|---|---|---|---|---|---|---|
|  |  |  |  | Hue | Water resistance | Light resistance | AMES evaluation |
| Ex. 7 | m-Amino phenol | Hexyl group | o-Toluidine | Reddish black | A | B | Negative |
| Ex. 8 | m-Amino phenol | Octyl group | Sulfanilic acid | Reddish black | B | B | Negative |
|  |  | Dye |  |  |  |  |  |
| Comp. Ex. 1 | C.I. Direct Black 168 | | | Reddish black | C | B | False positive |
| Comp. Ex. 2 | C.I. Direct Black 19 | | | Yellowish black | A | B | Positive |
| Comp. Ex. 3 | C.I. Direct Black 154 | | | Greenish black | B | B | Positive |

TABLE 2

| | | Ames test results | | | | |
|---|---|---|---|---|---|---|
| | | Concentration of substance to be tested (μg/plate) | | | | |
| | S 9 | 20 | 78 | 313 | 1250 | 5000 |
| Ex. 1 | − | 0.95 | 0.82 | 0.82 | 0.95 | 0.77 |
|  | + | 1.18 | 1.17 | 1.32 | 0.41 | 0.29 |
| Ex. 2 | − | 1.19 | 1.32 | 1.04 | 1.06 | 1.18 |
|  | + | 1.17 | 1.09 | 1.02 | 0.83 | 0.87 |
| Ex. 3 | − | 0.87 | 0.83 | 0.78 | 0.87 | 0.70 |
|  | + | 1.30 | 1.07 | 1.17 | 1.67 | 0.77 |
| Ex. 4 | − | 1.06 | 1.02 | 1.05 | 0.99 | 1.02 |
|  | + | 1.23 | 1.22 | 1.21 | 1.51 | 1.17 |
| Ex. 5 | − | 1.00 | 0.78 | 0.87 | 1.39 | 1.65 |
|  | + | 1.60 | 1.56 | 1.44 | 1.72 | 1.20 |
| Ex. 6 | − | 0.82 | 1.13 | 1.11 | 1.32 | 1.60 |
|  | + | 1.09 | 1.04 | 1.28 | 1.48 | 1.33 |
| Ex. 7 | − | 1.28 | 1.50 | 1.06 | 1.33 | 0.94 |
|  | + | 1.20 | 1.15 | 0.82 | 0.44 | 0.53 |
| Ex. 8 | − | 0.98 | 0.94 | 0.91 | 0.93 | 1.02 |
|  | + | 1.25 | 1.22 | 1.16 | 0.88 | 0.91 |
| Comp. Ex. 1 | − | 0.82 | 1.13 | 0.88 | 0.88 | 0.88 |
|  | + | 0.83 | 0.88 | 1.08 | 1.38 | 3.38 |
| Comp. Ex. 2 | − | 0.92 | 0.88 | 1.48 | 2.24 | 2.84 |
|  | + | 8.33 | 24.2 | 75.0 | 52.8 | 4.00 |
| Comp. Ex. 3 | − | 0.72 | 0.68 | 0.84 | 0.76 | 0.96 |
|  | + | 1.92 | 2.35 | 2.50 | 1.50 | 0.85 |

What is claimed is:

1. A trisazo dye represented by the formula:

$$A-N=N-\underset{}{\bigcirc}-\underset{R}{N}-\underset{}{\bigcirc}-N=N-\underset{MO_3S}{\overset{NH_2\ OH}{\bigcirc\bigcirc}}-\underset{SO_3M}{}N=N-B \qquad (I)$$

wherein B is a substituted or non-substituted phenyl group, A is a phenyl group substituted with at least one substituent selected from the group consisting of an amino group, a substituted amino group and a hydroxyl group, R is a substituted or non-substituted phenyl group or an alkyl group having 1 to 8 carbon atoms, and M is hydrogen, alkali metal, aliphatic alkyl ammonium or alkanol ammonium.

2. An aqueous ink composition which comprises the trisazo dye according to claim 1 and an aqueous medium.

3. A trisazo dye according to claim 1 of the formula:

$$H_2N-\underset{}{\bigcirc}\overset{OH}{-}N=N-\underset{}{\bigcirc}-\underset{\underset{\bigcirc}{|}}{N}-\underset{}{\bigcirc}-N=N-\underset{HO_3S}{\overset{NH_2\ OH}{\bigcirc\bigcirc}}-\underset{SO_3H}{}N=N-\underset{}{\bigcirc}.$$

4. A trisazo dye according to claim 1, of the formula:

$$HO-\underset{}{\bigcirc}\overset{OH}{-}N=N-\underset{}{\bigcirc}-\underset{\underset{\underset{CH_3}{|}}{\bigcirc}}{N}-\underset{}{\bigcirc}-N=N-\underset{HO_3S}{\overset{NH_2\ OH}{\bigcirc\bigcirc}}-\underset{SO_3H}{}N=N-\underset{}{\bigcirc}.$$

5. A trisazo dye according to claim 1, of the formula:

6. A trisazo dye according to claim 1, of the formula:

7. A trisazo dye according to claim 1, of the formula:

8. A trisazo dye according to claim 1, of the formula:

9. A trisazo dye according to claim 1, of the formula:

10. A trisazo dye according to claim 1, of the formula:

11. A trisazo dye according to claim 1, of the formula:

12. The aqueous ink composition according to claim 2, wherein said trisazo dye is present at a level of 3-15% by weight.

13. The aqueous ink composition according to claim 12, wherein said trisazo dye is present at a level of about 5-10% by weight.

14. The aqueous ink composition according to claim 2, wherein said aqueous medium comprises water and an aqueous organic solvent.

15. The aqueous ink composition according to claim 14, wherein said aqueous organic solvent is selected from the group consisting of monovalent alcohols, divalent alcohols, trivalent alcohols, monoalkyl ethers of diols and monoacetates of diols.

16. The aqueous ink composition according to claim 14, wherein said aqueous organic solvent is selected from the group consisting of iso-propanol, ethylene glycol, propylene glycol monoalkyl ether, N-methyl-2-pyrrolidone, ethyllactate and dioxane.

17. The aqueous ink composition according to claim 15, wherein said monovalent alcohol is selected from the group consisting of ethanol, n-propanol, iso-propanol, n-butanol, diacetone alcohol, benzyl alcohol and cyclohexanol.

18. The aqueous ink composition according to claim 16, wherein said divalent alcohol is selected from the group consisting of ethylene glycol, diethylene glycol, trimethylene glycol, triethylene glycol, tetraethylene glycol, polyethylene glycol, propylene glycol and butane diol.

19. The aqueous ink composition according to claim 15, wherein said trivalent alcohol is selected from the group consisting of glycerin, trimethylolpropane and 1, 2, 6-hexanetriol.

20. The aqueous ink composition according to claim 15, wherein said monoalkylether of a diol is selected from the group consisting of ethylene glycol monomethyl ether, ethylene glycol monoethyl ether, propylene glycol monoethyl ether, diethylene glycol monoethyl ether, diethylene glycol monobutyl ether and dipropylene glycol monoethyl ether.

21. The aqueous ink composition according to claim 15, wherein said monoacetate of a diol is selected from the group consisting of ethylene glycol monoacetate and propylene glycol monoacetate.

22. The aqueous ink composition according to claim 14, wherein said aqueous organic solvent is present in an amount of 5-95% by weight.

* * * * *